Figure 1:
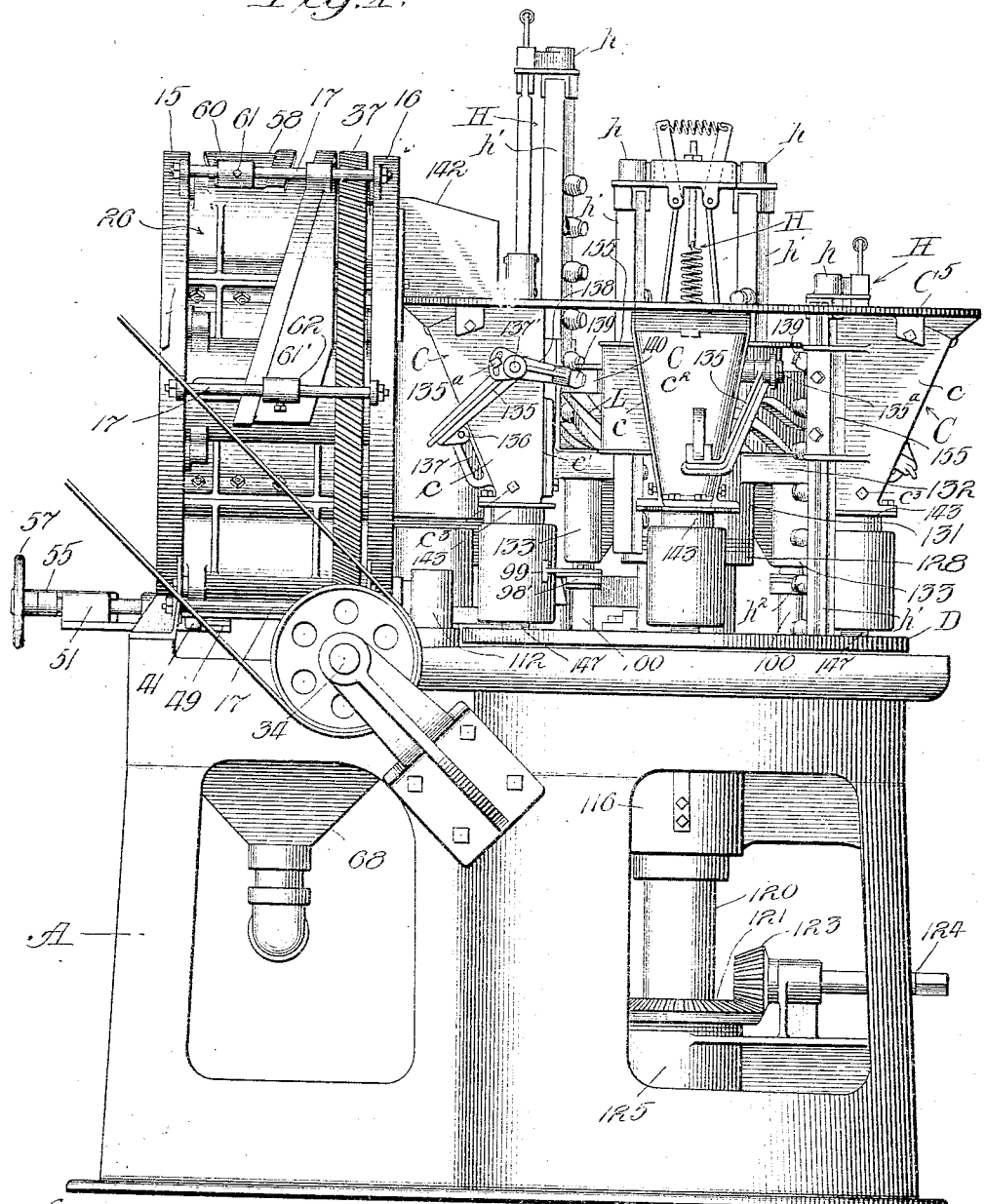

C. F. COLBERT.
FILLING MACHINE.
APPLICATION FILED JAN. 8, 1912.

1,072,429.

Patented Sept. 9, 1913.
12 SHEETS—SHEET 1.

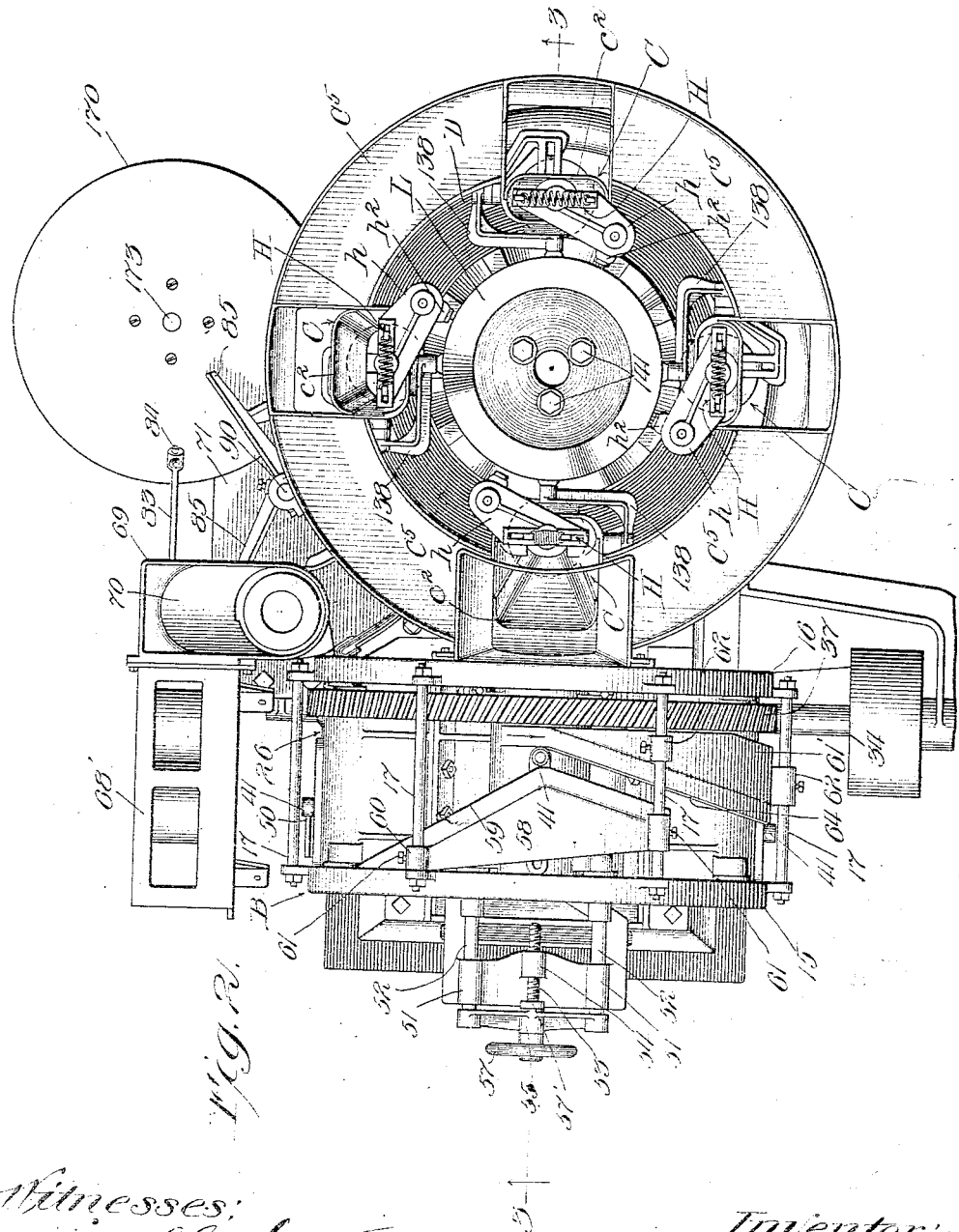

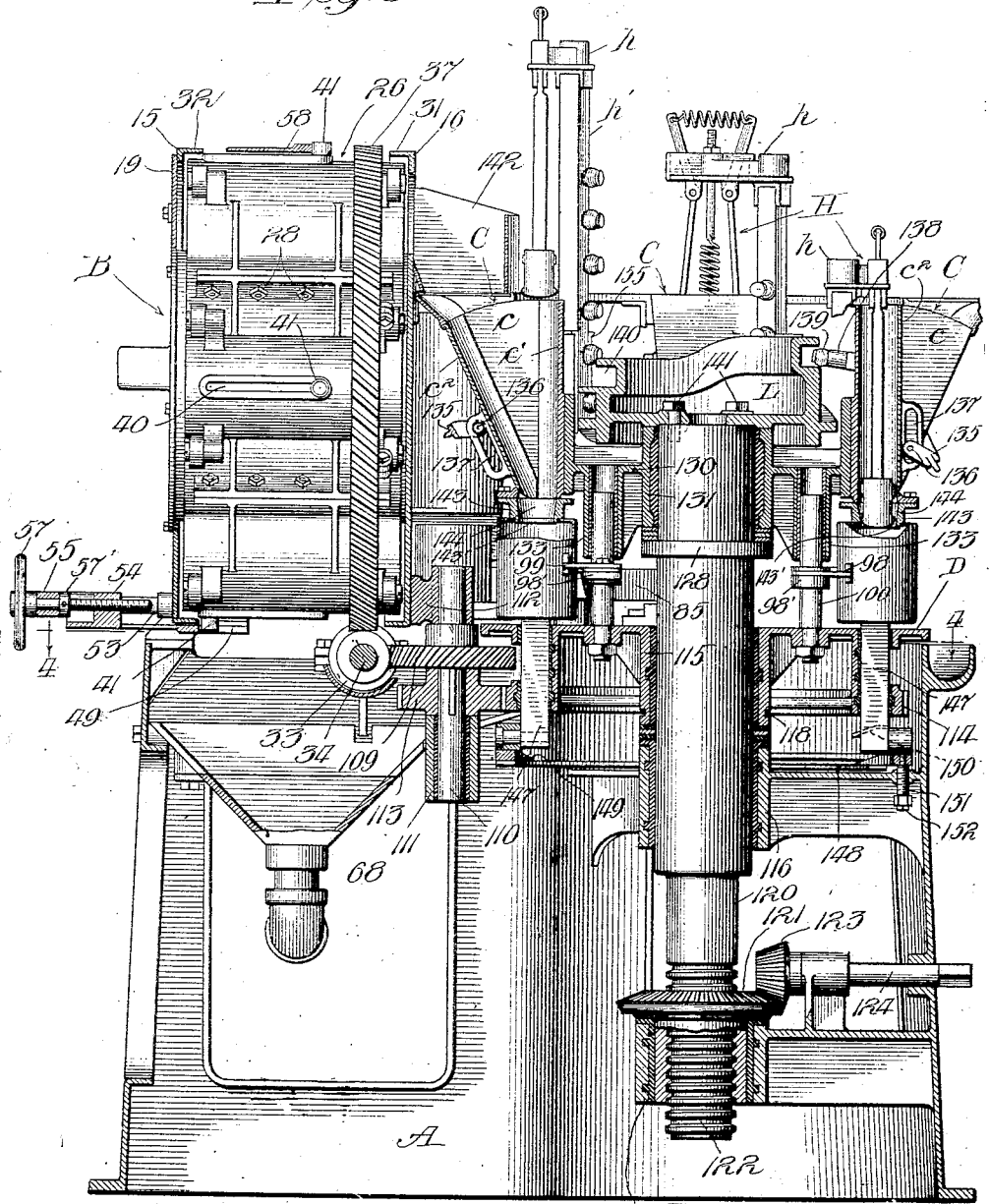

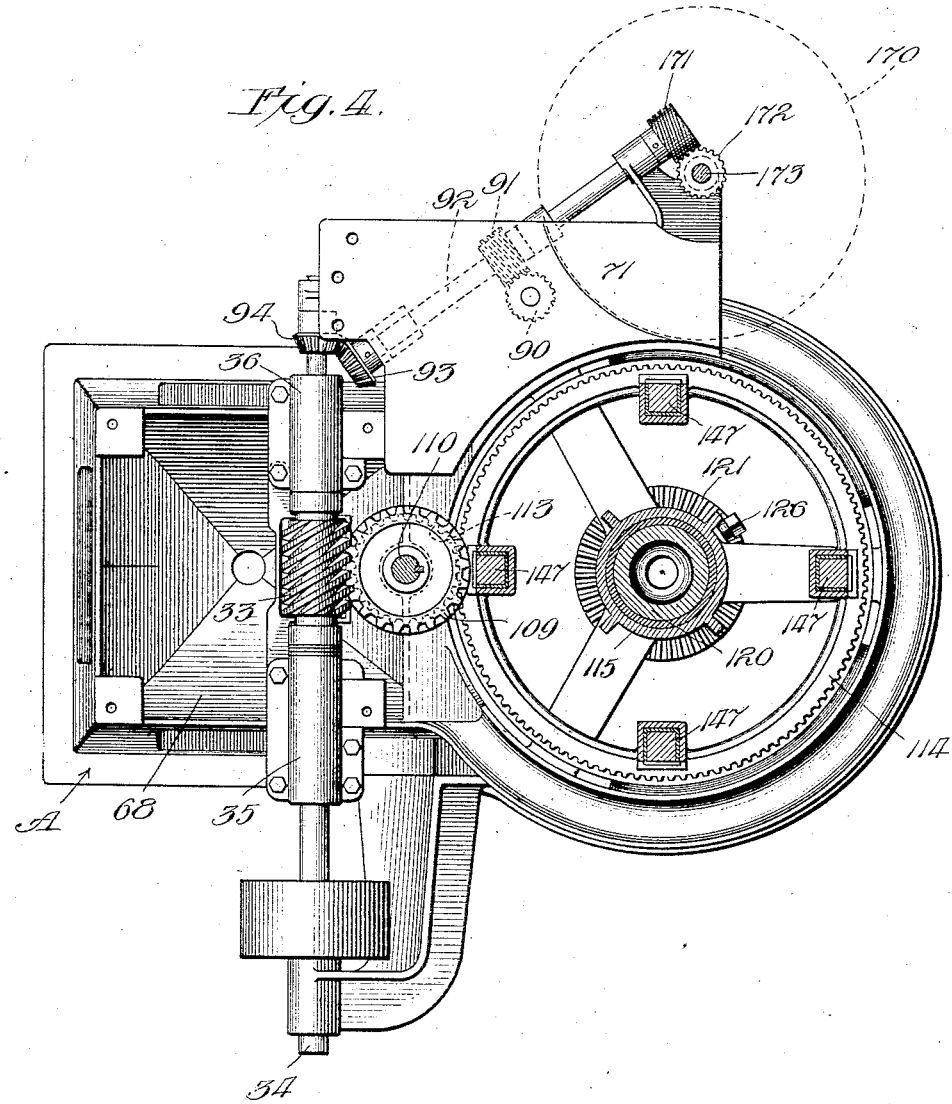

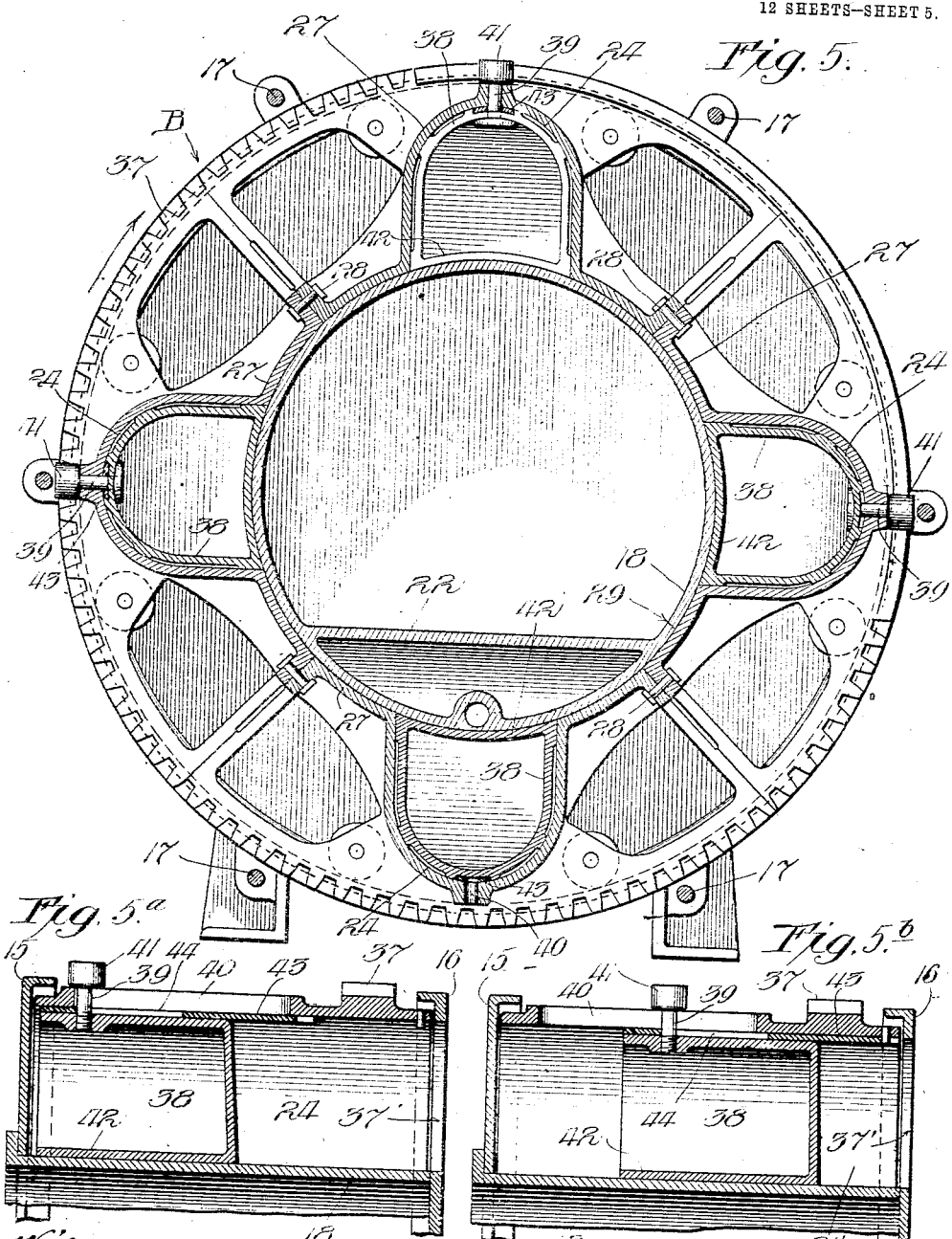

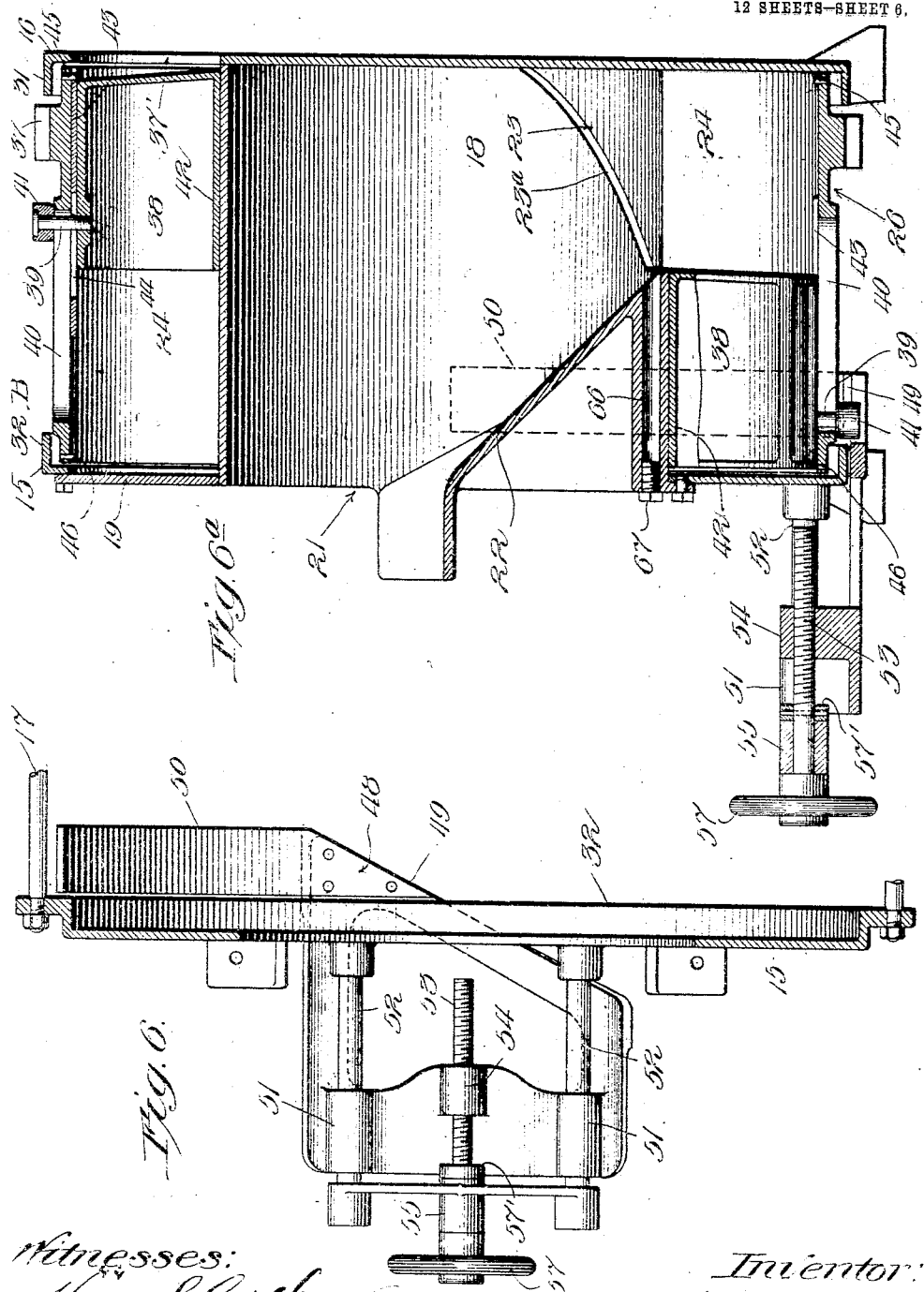

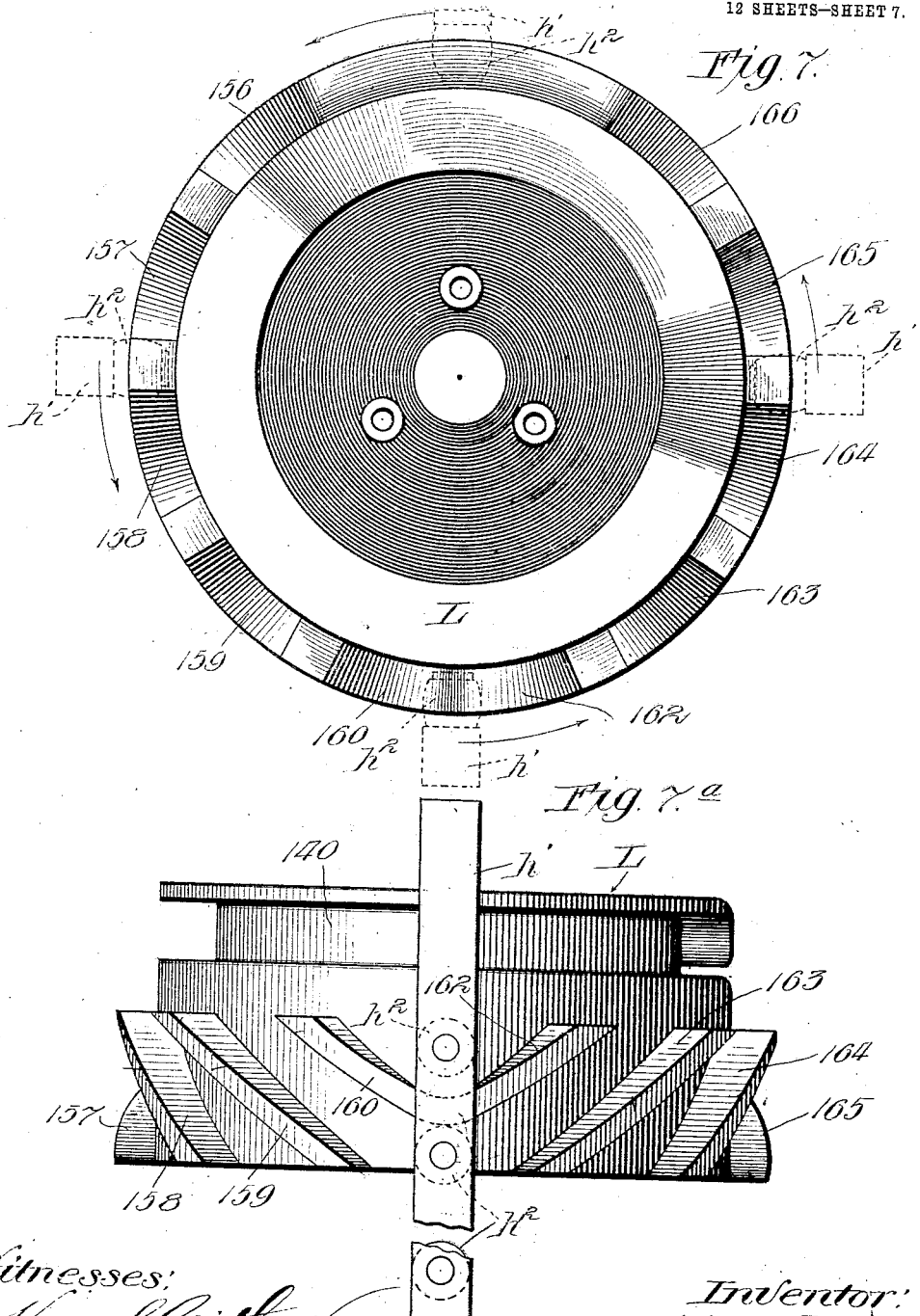

C. F. COLBERT.
FILLING MACHINE.
APPLICATION FILED JAN. 8, 1912.
1,072,429.
Patented Sept. 9, 1913.
12 SHEETS—SHEET 8.
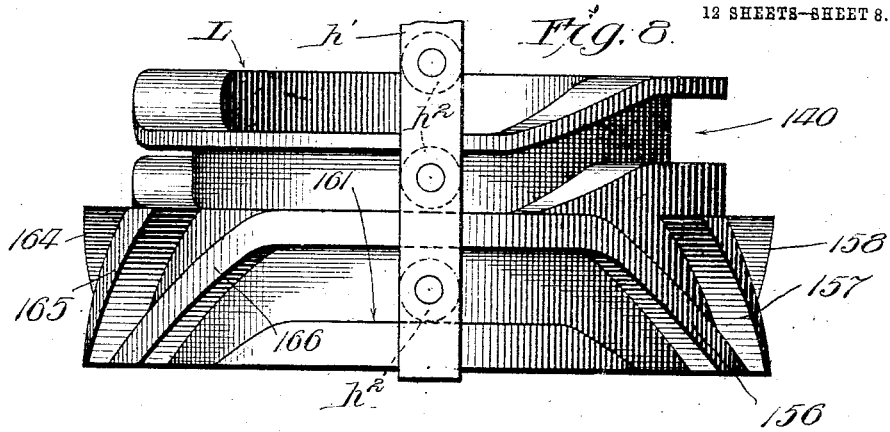
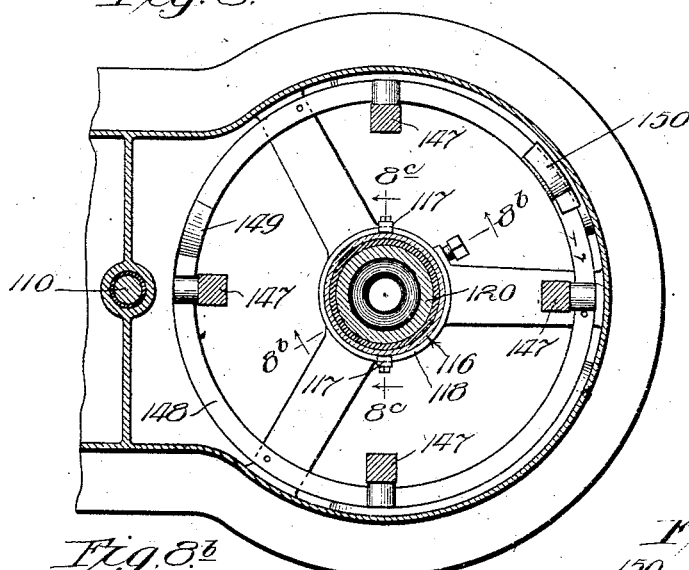
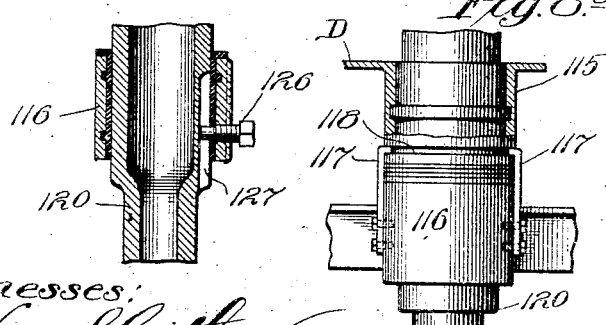
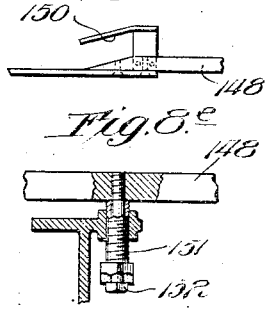
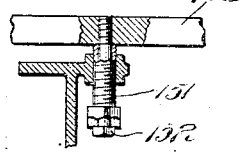

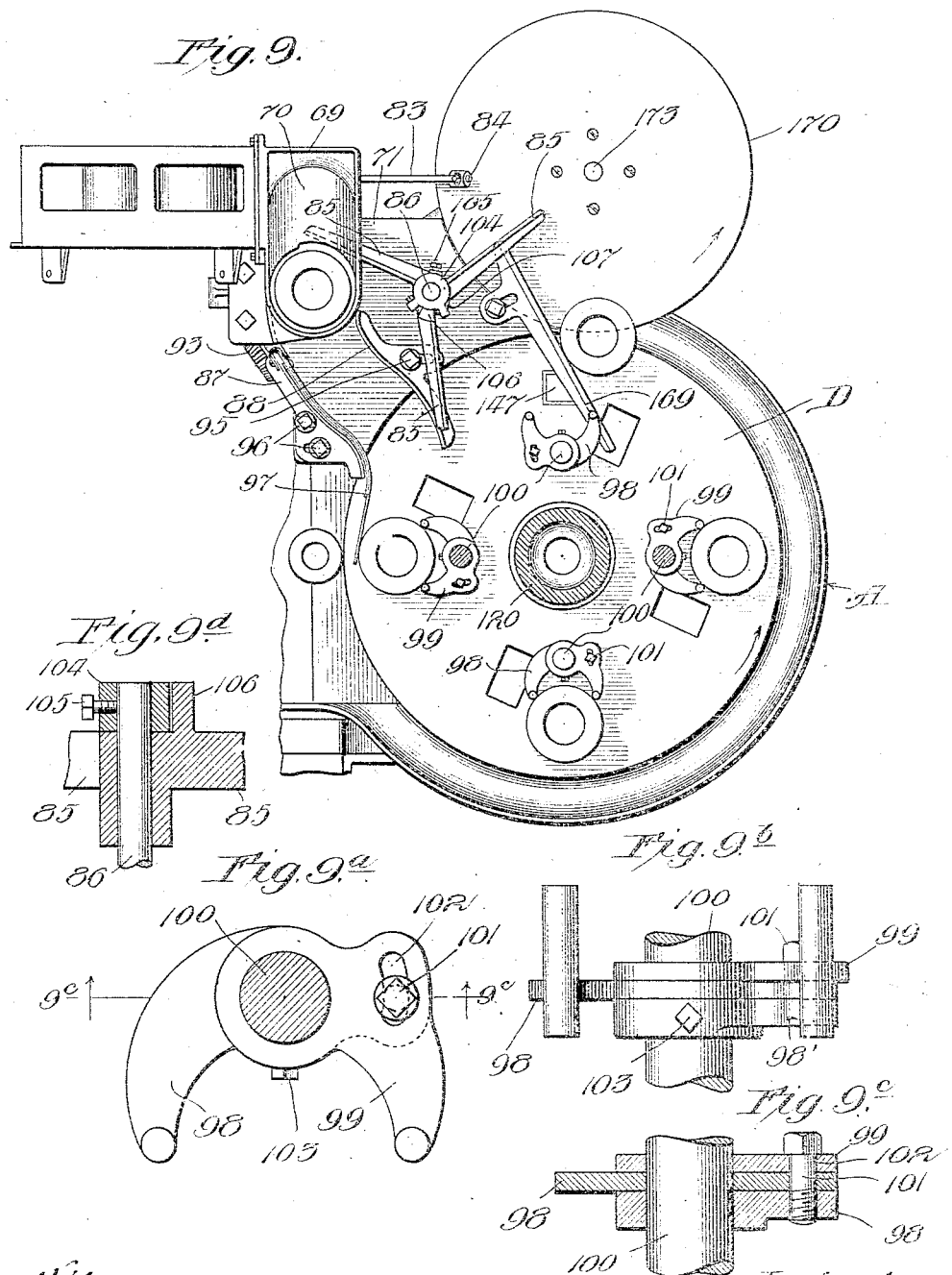

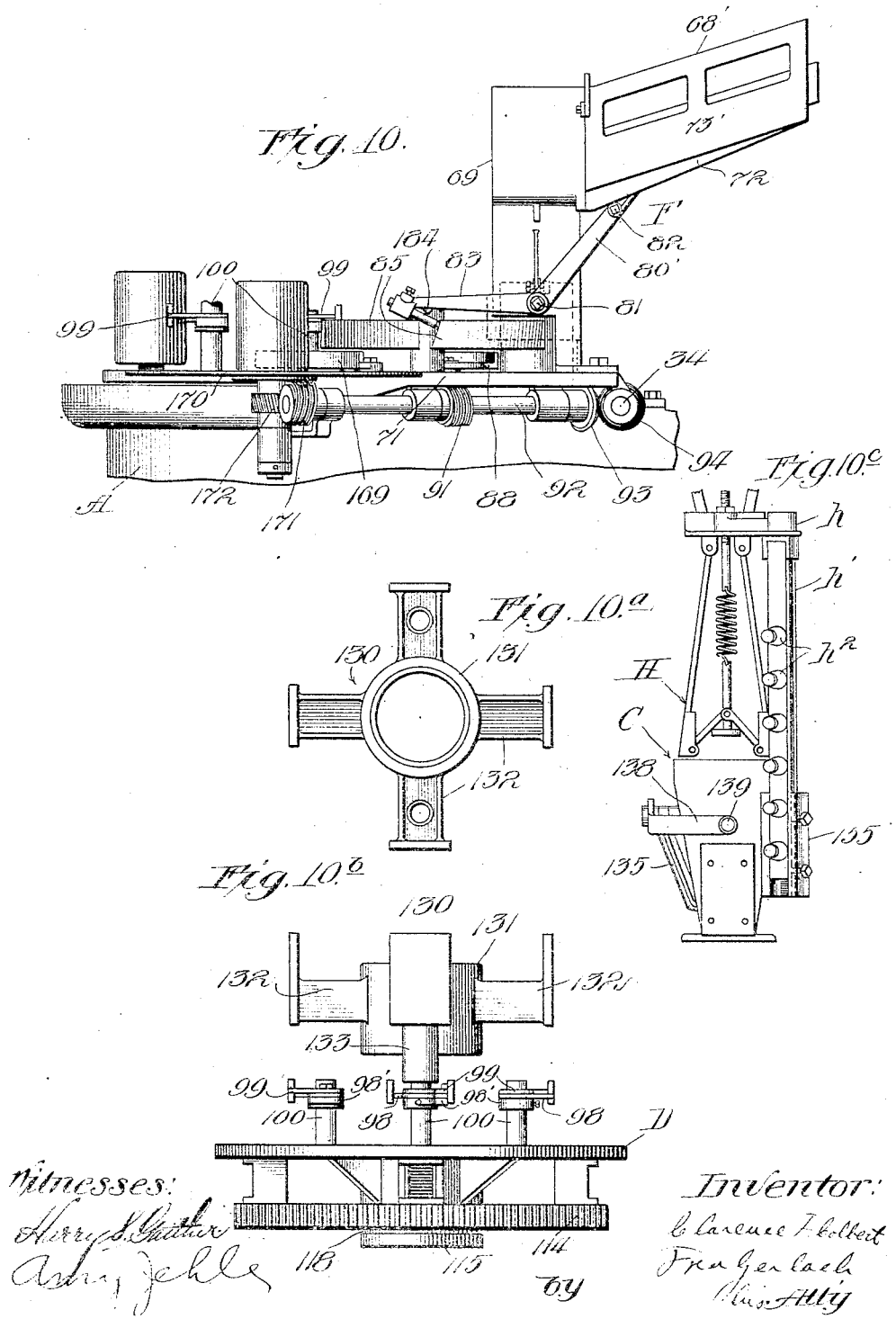

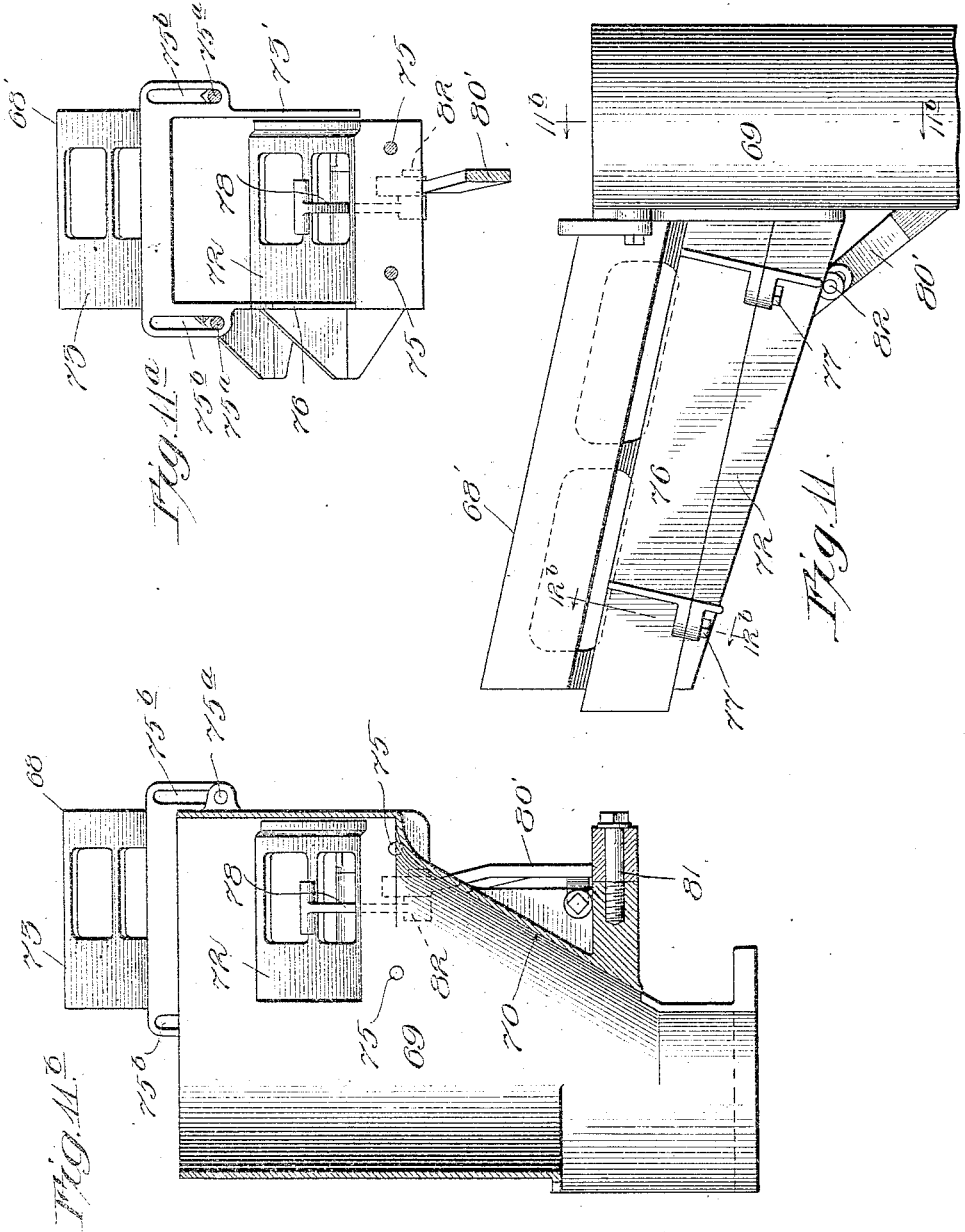

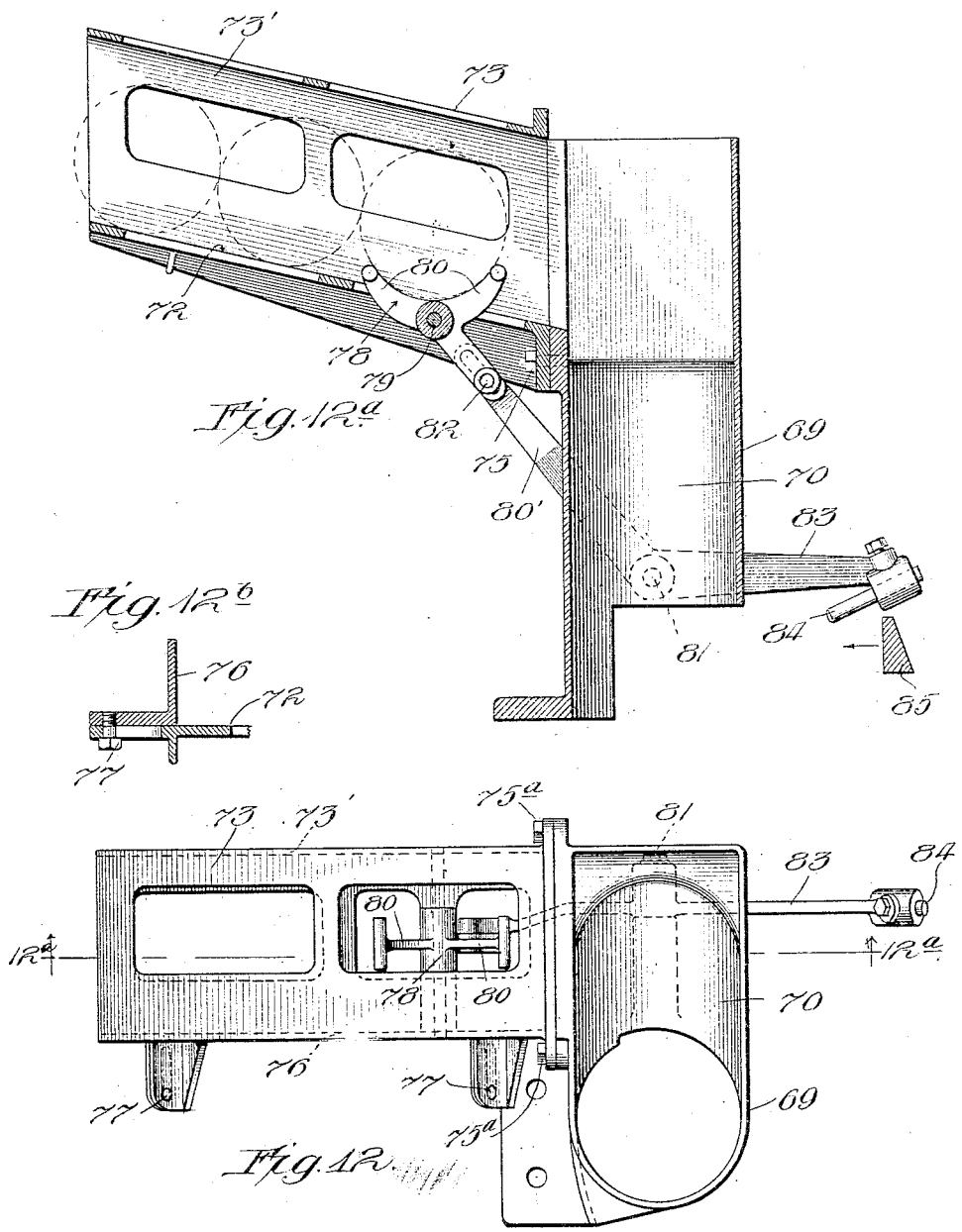

UNITED STATES PATENT OFFICE.

CLARENCE F. COLBERT, OF HOOPESTON, ILLINOIS.

FILLING-MACHINE.

1,072,429.  Specification of Letters Patent.  Patented Sept. 9, 1913.

Application filed January 3, 1912. Serial No. 669,939.

*To all whom it may concern:*

Be it known that I, CLARENCE F. COLBERT, a resident of Hoopeston, in the county of Vermilion and State of Illinois, have invented certain new and useful Improvements in Filling-Machines, of which the following is a full, clear, and exact description.

The invention relates to filling-machines and more particularly to that type which is adapted for filling cans with vegetables such as tomatoes.

One object of the invention is to provide an improved mechanism for operating the plungers which force the material from the hoppers into the cans.

Another object of the invention is to provide improved mechanism for operating a rotatable series of plungers which are adapted to successively eject the material from the hoppers into the cans.

The invention further designs to improve the measuring-mechanism, can-feeding-mechanism and the parts of a filling-machine.

The invention consists in the several novel features hereafter set forth and more particularly defined by claims at the conclusion hereof.

In the drawings; Figure 1 is a side elevation of a filling-machine embodying the invention. Fig. 2 is a plan. Fig. 3 is a vertical section taken on line 3—3 of Fig. 2, parts being shown in elevation. Fig. 4 is a horizontal section taken on line 4—4 of Fig. 3. Fig. 5 is a vertical section through the measuring mechanism. Fig. 5ª is a section through one of the measuring-receptacles, the plunger therein being shown retracted in position to permit a charge of material to fall into the receptacle, being a section on line 5ª—5ª of Fig. 5. Fig. 5ᵇ is a section showing the plunger in position assumed when the material in the receptacle has been partly ejected. Fig. 6 is a plan of the cam for operating the plungers in the measuring receptacles into position to compress the material, and its adjusting-device, the outer drum-head being shown in section. Fig. 6ª is a central vertical longitudinal section of the measuring mechanism. Fig. 7 is a plan of the cams for operating the pivoted walls of the filling-hoppers and the plungers for forcing the material from the hoppers into the cans. Fig. 7ª is a side elevation of said cams. Fig. 8 is another side elevation of said cams, viewed from the opposite side. Fig. 8ª is a plan of the stationary track and cams for operating the can-lifting plungers, the main frame which said track is disposed, and other parts being shown in section. Fig. 8ᵇ is a section taken on line 8ᵇ—8ᵇ of Fig. 8ª, showing the device for holding the adjustable post against rotation. Fig. 8ᶜ is a section taken on line 8ᶜ—8ᶜ of Fig. 8ª. Fig. 8ᵈ is a detail of a portion of the cam which lowers the can-lifting plungers. Fig. 8ᵉ is a detail section of the device for adjusting the track and cams for the can-lifting plungers. Fig. 9 is a plan of the mechanism for delivering cans to the filling-table, and for removing them from the table after they have been filled. Fig. 9ª is a plan of one of the adjustable-devices for positioning the cans beneath the filling-hoppers. Fig. 9ᵇ is an elevation of the same. Fig. 9ᶜ is a section taken on line 9ᶜ—9ᶜ of Fig. 9ª. Fig. 9ᵈ is a detail of the adjustable connection between the arms for sweeping the cans onto the rotating table, and the shaft for operating them. Fig. 10 is a side elevation of the can-feeding mechanism. Fig. 10ª is a plan of the frame for supporting the filling-hoppers. Fig. 10ᵇ is a side elevation of said frame, the rotatable can-table and parts connected thereto. Fig. 10ᶜ is a detail elevation showing one of the plunger-guides on the filling-hoppers. Fig. 11 is a side elevation of the runway for delivering cans to the revolving table. Fig. 11ª is an inner end elevation of said run-way. Fig. 11ᵇ is a section taken on line 11ᵇ—11ᵇ of Fig. 11 on an enlarged scale. Fig. 12 is a plan of said runway. Fig. 12ª is a section taken on line 12ª—12ª of Fig. 12. Fig. 12ᵇ is a section taken on line 12ª—12ª of Fig. 11, showing the adjustable connection between the bottom and one side of the run-way for directing cans to the chute.

The several mechanisms of the machine are sustained by a suitable frame A within which some of the operating mechanisms are disposed. At one side of the frame and on the top thereof, is mounted the mechanism B for the delivering measured quantities of material to the rotatable filling devices, as the latter are successively brought into position to receive charges of material from said mechanism.

The machine comprises a series (four) of rotatable filling-devices each comprising a hopper C and a collapsible plunger H. These devices are rotated to successively bring them into position to receive charges of material from the measuring mechanism. During the rotation of the hoppers, after they receive a charge of material, the latter is forced into cans on a rotating table D beneath the hoppers, by the vertically reciprocating collapsible plungers H and the filled cans are discharged laterally from the table. During each rotation of a hopper, a can will be placed in position beneath it to receive a charge, the filling operation will be completed and the filled can will be removed, as hereinafter more fully set forth.

The measuring-mechanism B (Sheets 1, 2, 3, 5 and 6) comprises an outer head 15 and an inner head 16 both of which are rigidly secured to the top of frame A and are rigidly secured together in spaced relation by cross-rods 17. A stationary drum 18 is centrally disposed in said head and ring, the head 16 closing the inner end of the drum and a removable plate 19 forms a part of head 15. This drum is adapted to receive material in bulk, its outer end being open as at 21, and has an inclined wall 22 which extends inwardly and downwardly from the outer end of the drum, to direct the material toward the inner end and bottom of the drum, which is cut away or open as at 23 to permit the material to fall into the measuring-receptacles 24, which rotate around drum 18 and successively receive material from the drum as they pass beneath bottom-opening 23 in drum. Receptacles 24 are formed in a rotatable body 26 which is made up of arcuate sections 27 which are secured together by bolts 28, and one of the receptacles 24 being formed in each section. The inner face portions 29 of the receptacle fit around drum 18 and serves as closures for the opening 23 in said drum, when there is no receptacle 24 beneath said opening to receive material. Rotating body 26 carries rollers which ride on inwardly extending flanges 31 and 32 formed upon head 16 and head 15 respectively. Constant rotary motion is imparted to body 26, by an oblique toothed gear 33 on the main drive-shaft 34 which is journaled in bearings 35 and 36 on the main frame, and a correspondingly toothed gear-ring 37 which is integrally formed with the arcuate sections 27 of body 26. This construction is one which facilitates assembly of the parts around the stationary drum and one which avoids the necessity of handling bulky parts, because in practice, this body is quite large in diameter.

The upper portion of head 16 is formed with a lateral discharge opening 37' through which the charges of material in receptacles 24 will be successively delivered into the rotating filling-hoppers C. A plunger 38 is slidably mounted in each receptacle 24 and is operated so that when the receptacle is in its lowermost position it will permit the material to fall into the receptacle through the opening 23 in drum 18, is operated inwardly to compress the charge in the receptacle so that the vegetables will be in a comparatively solid mass and so each receptacle will be completely filled with a uniform amount of material, and as each receptacle passes into its uppermost position and registry with discharge opening 37, the plunger is operated, as shown at the top of Fig. 6ª, to eject the material from the receptacle. The edge 23ª of opening 23 in drum 18 is inclined and formed to cut the compressed material projecting from the receptacles as they are rotated, and sever the excess material from that in the receptacles. Each receptacle 24 carries a stud 39 which extends through a slot 40 in rotating body 27, and a roller 41 is journaled on the outer end of said stud, operative to stationary cams for reciprocating the plungers in their receptacle. The inner face 42 of each receptacle is arcuate and fits around the periphery of drum 18. Each slot 40 is closed to prevent the material from escaping therethrough, when the plunger is in its outward position, by a plate 43 which fits between the plunger and the surrounding wall of receptacle 24 and bears frictionally upon the plunger so that the latter will shift it under control of stops 45 and 46. Slots 44, through which studs 39 extend to permit the receptacles to move inwardly after the plates have been arrested by stops 45 and to move outwardly without moving plate 43 when the latter has been arrested by stop 46. The inner face of ring 15 is disposed to serve as stop 46. By means of these plates, slots 40 will be closed and prevent the escape of material from receptacle 24 when the plunger is in its outward position.

In practice, it is desirable to regulate the capacity of the receptacles, or the quantity of material received by each in rotative succession, so that the quantity of material composing the charges delivered into the filling-devices will correspond to the size of the can to be filled and so that accurate and uniform charges will be delivered into the hopper. This variation is effected by the variation of the inward stroke of the plungers 38 before the receptacle is cut off from the drum 18, by an adjustable cam (Fig. 6) 48 which is disposed beneath the drum 18 and has an inclined edge 49 which is engaged by rollers 41 of the plungers 38 and a straight edge 50 which holds the plungers in position to keep the plungers in the receptacles 24 compressed until communication between the receptacle and the drum has been cut off. This cam 48 comprises a frame which is provided with lugs 51 which are slidably mounted on rods 52 which are secured to head 15. A screw 53 extends through a screw-threaded lug 54 on the cam frame and is journaled in a bearing 55 on a cross-bar 56 which is secured to the outer ends of rods 52. A hand-wheel 57 is secured to screw 53 and by rotation of the screw, the cam 48 may be adjusted inwardly or outwardly to vary the compression stroke of the plungers 38 in receptacles 24. Cross-bar 54 which is rigid with cam 48, is held between hand-wheel 57 and a collar 57', which is pinned to screw 53, so that said bar will be shifted inwardly or outwardly according to the direction of rotation of said screw.

A cam 58 serves to operate rollers 41 on plungers 38, as the receptacles 24 pass into registry with discharge-opening 37 being provided with an inclined edge 59 for that purpose. Said cam is provided with lugs 60 through which the upper cross-rods 17 extend, and bolts 61 adjustably secure said lugs and cam on said rods. A cam 61' is adjustably secured to two of the rods 17, by lugs 62, and is provided with an inclined edge 64 which shifts the rollers 41 on plungers 38 outwardly, after the material has been discharged from the receptacle, and before the receptacles pass beneath opening 23. This delivery-mechanism thus comprising a rotatable series of receptacles having plungers therein which are operated by cams to cause uniform charges of material to be successively delivered to the filling-hoppers and which may be regulated to vary the amount of each charge.

The operation of this delivery-mechanism will be as follows: Continuous rotary movement will be imparted to the rotating receptacles with the plungers therein, so that they will successively pass beneath opening 23 in drum 18 and be filled with material in said drum. As each receptacle passes beneath said opening, the material will fall into it. Before the receptacles pass away from the opening, cam 48 will operate the plunger 38 in the receptacles, to compress the material and force the excess, if any, back into the drum and as said receptacle passes away from said opening, any projecting material in the receptacle will be severed from the material in the drum by knife 23ª. As each receptacle, in rotative succession passes upwardly, and into registry with discharge opening 37, the plunger therein will be operated by cam-edge 58, to eject the material from the receptacle and into the filling-hoppers which rotate horizontally and in synchronism with the measuring receptacles, so that as each charge is ejected from the delivery-mechanism, there will be a filling-hopper to receive it. After the material has been ejected the plungers in the receptacles are shifted outwardly by cam-edge 64 to bring them into position and receive another charge as the receptacles pass beneath opening 23. A duct 66 is formed in drum 18 so that when desired, the drum may be drained, and this duct is normally closed by screw plug 67. A hopper 68 is disposed beneath the measuring-devices, to carry off any liquid which may leak out of said mechanism and to carry off water whenever the delivery mechanism is being flushed out. Duct 66 may also be employed to drain off any excess of liquid which is desirable at times in filling cans with tomatoes so that the contents of the can will have the desired solidity.

The machine comprises rotating table D on which the cans to be filled are successively fed beneath hoppers C, through which the material is forced into the cans by plungers H, the hoppers receiving the material from the measuring-mechanism. After the hoppers have received charges, these plungers are operated to force the material into the cans while the tables and hoppers rotate, together, and after the cans have been filled, they are successively removed from the table, the filling-operation thus being continuously and rapidly conducted.

Mechanism F (Sheets 10, 11 and 12) is provided for delivering cans onto table D and beneath the rotating hoppers C. This mechanism comprises an inclined run-way 68' which is adapted to receive the cans at its upper and outer end and conduct them to the device for singly delivering the cans into an inclined chute 69 which is formed with an inclined wall 70 which tips the cans from the horizontal position in which they are delivered into the chute, to a vertical position, and directs the cans onto a stationary supporting bracket 71 which is secured to the main frame A. Run-way 68 comprises a bottom 72 on which the cans will roll and which is secured to the chute 69 at 75, a top-wall 73 and a side-wall 73' which are integrally formed and are secured to the chute 69 by bolts 75ª which extend through slot 75ᵇ. Said chute has its lower end rigidly secured upon bracket 71. The opposite side 76 of the run-way is separately formed from the bottom and is adjustably connected thereto by bolt and slot connections 77 (Fig. 12ᵇ) whereby this side may be adjusted laterally to vary the width of the run-way and adapt it for cans of different heights, the cans in the chute being horizontally disposed so that they will roll down the run-way. By means of bolts 75ª and slot 75ᵇ, the top may be adjusted to adapt the run-way for cans of different diameters. The cans in the run-way are fed singly to chute 69 by a lever 78 (Fig. 12ª) which is pivoted at 79 in the bottom of the run-way 68 and is provided with oppositely disposed arms 80 between which the cans will roll. Lever 78 is connected to a bell-crank lever 80' which is pivoted as at 81 to the side of chute 69, and by a stud and slot connection 82 to lever 78. The other arm 83 of bellcrank lever 80 is provided with an adjustable stud 84 which is adapted to be struck by arms 85 which rotate horizontally and are adjustably secured to a vertical shaft 86. As each of said arms 85 passes under stud 84 it will rock lever 80, which in turn, will rock lever 78 and cause the can held therein to be released and pushed into chute 69, into which the can will fall, and by which the can will be delivered onto brackets 71 in vertical position. The cans delivered onto said bracket will be successively swept by arms 85 (Fig. 9) over said bracket, between adjustable guides 87 and 88 on said bracket, and onto rotating table D. Shaft 86 to which arms 85 are connected is constantly driven by a gear 90 (Fig. 4) which is secured to said shaft beneath bracket 71, a gear 91 on a shaft 92 which is journaled in suitable bearings carried by said bracket and is driven by a gear 93 which meshes with a gear 94 on main drive shaft 34. Can-guide 88 is adjustably connected to supports 71 by bolt and slot 95. Guide 87 is connected by bolts and slots 96 to support 71, and comprises (Fig. 9) elastic or spring-metal strips 97 which serve to press the cans passing between guides 87 and 88, against guide 88, and the outward end of one of the springs serves also to press the can into positioning-devices on the rotating table D whereby the cans will be accurately positioned beneath the hoppers. Each of these positioning devices, (Fig. 9ª) comprises a pair of jaws or arms 98 and 99 which are mounted on upright rod 100 which has its lower ends secured to rotating table D. These jaws are relatively adjustable to adapt them for correctly positioning cans of different diameters beneath the hoppers C, by a bolt 101 which is screw-threaded into an arm 98' and extends through a slot 102 in arm 99. By loosening this bolt the jaws may be spread apart or moved together. Each arm 98' is adjustably connected to rod 100, by a bolt 103. By conjoint adjustment of said bolt and the connection between the arms, cans of different diameters delivered onto the table from the can-feeding mechanism will be correctly positioned beneath the hoppers, being pressed into position between arms 98 and 99 by the springs 97.

In order to time the delivery of the cans onto the table so they will be directed into the jaws 98 and 99 which rotate with table D, arms 85 are made adjustable by means of a collar 104 (Figs. 9 and 9ª) which is secured on the upper end of shaft 86 by a screw 105. All three of said arms 85 are formed on a common hub fitting around shaft 86. By adjustment of screws 107 by which arms 85 are caused to rotate with shaft 86, the arms may be adjusted around shaft 86, so that the operation of the arms may be correctly timed to deliver cans of different diameters into the positioning devices on the rotating table.

Continuous rotation is imparted to table D by gear 33 on shaft 34 which meshes with and drives a gear 109 on a short vertical shaft 110 which is journaled in bearings 111 and 112 which are carried by the framework of the machine. A pinion 113 on shaft 110 meshes with and drives a gear-ring 114 which is integrally formed with the table. The central portion of the table D is provided with a hub 115 which is sustained by a bearing 116 on the main frame A, and rotates around a post 120. The table is held against vertical movement relatively to the frame by keepers 117 which are secured to bearings 116 (Fig. 8ᶜ) and have terminals extending into an annular groove 118 on the hub 115 of said table.

The filling-hoppers C are caused to rotate with table D and are vertically adjustable, relatively to the table to adapt the machine for filling cans of different sizes. For this purpose, post 120 is slidably mounted in bearing 116 and extends through hub 115 of the table. Vertical adjustment of this post may be effected by a gear-wheel 121, the hub of which is interiorly threaded to engage a screw-thread 122 on the lower end of the post, a pinion 123 meshing with said gear and secured to a shaft 124 which is journaled in the frame and may be rotated by a crank or wrench applied to the outer end thereof. The hub of gear 121 is journaled in a bearing 125 in the lower part of the main frame A. Post 120 secured against rotation by a bolt 126 (Fig. 8ᵇ) which is screw-threaded through bearing 116 and has a terminal extending into a groove 127 in said post. The upper end of post 120 has a shoulder 128 which serves to rotatably support the hopper-carrying frame 130, so that vertical adjustment of the post will effect corresponding adjustment of said frame and the hoppers C carried thereby. This frame comprises a hub 131 and four integral arms 132 to the outer ends of which the filling hoppers C are rigidly secured. Conjoint rotation of frame 130 and the hoppers is effected by two of the posts 100 which extend vertically from the table and into sockets 133 formed in said frame. The posts 100 are secured in table D and frame 130 will slide on posts 100 when the hoppers are adjusted vertically.

Each hopper C has inwardly and downwardly sloping sides c, a straight back-wall c', and a movable front-wall c² which is pivoted at its lower end, as at c³, to the lower portion of the sides c of the hopper. Pivoted hopper-wall c² swings inwardly at its upper end, so an enlarged opening will be provided at the upper end to adapt the hopper for receiving a charge of material such as tomatoes from measuring-devices, while the hoppers are being rotated. Each pivoted hopper-wall $c^2$ is operated by a lever 135 (Fig. 1) which comprises an arm with a bifurcated end carrying a pin 136 which works in a slot 137 in a lug on said wall. Each lever 135 is pivoted to one of the hopper-sides $c$ by a stud 137' and has an arm 138 which extends inwardly from pivoted lever and carries a roller 139 which travels in and a cam-groove 140 (Figs. 7 and 8) on a cam-wheel L which is secured to the upper end of vertically adjustable post 120 by bolts 141.

In order to cause pivoted walls of the filling-hoppers to be accurately shifted to cause one side of the collapsible plungers to fit against them, the arms of levers 135 for shifting said walls are adjustably connected by a bolt and slot $135^a$.

In operation, the cam-groove 140 will successively operate levers 135 to open the pivoted walls of hoppers C as they pass beneath a chute 142 which directs the tomatoes from the measuring-devices into the hoppers, and will operate said walls inwardly after the charges have been delivered into the hoppers, so that collapsible plungers H will be operative to force all the material in the hoppers into the cans. Cam-wheel L, being carried by adjustable post 120 may be adjusted vertically with the hoppers so that operative relation between levers 135 and cam-groove 140 will be maintained. The lower portion of each hopper C is formed by a nozzle or mouth-piece 143 which has a circular opening 144 therein, through which the collapsible plunger is adapted to pass. This mouth-piece is formed with a rib 143' which is adapted to enter the mouth of a can (Fig. 3) and the can is pressed to engage the bottom of said mouth-piece by plungers 147. Walls $C^3$ extend between the upper ends of hoppers C to hold the material in chute 142 until the open ends of the hoppers pass beneath the chute.

The cans fed onto the table D by the can-feeding mechanism are firmly held against displacement and against the mouth-piece 143 of the hoppers by the slidable plungers 147 (Figs. 3, $8^a$ and 9) which are slidably mounted in rotating table D and have outwardly projecting rollers at their lower ends which are adapted to ride on an annular stationary track 148. This track is provided with cams 149 and 150 for respectively raising and lowering the plungers to raise the cans against the mouth-piece 143 of the hoppers. The track 148 is vertically adjustable so that the operation of the plungers 147 may be adjusted to firmly hold the cans beneath the hoppers and for this purpose the track is sustained by screw-sleeves 151 (Fig. $8^e$) which are threaded through arms of the main frame A and have upper ends open which the track raises. Bolt 152 secured to the track extends through sleeves 151 to cause the track to be adjusted upwardly and downwardly with the sleeve and to hold the track in fixed relation in the frame. In operation, these plungers will be raised by cam 149 to clamp the cans delivered to the centering-devices 98 and 99, against the bottom of the hoppers, and after the cans have been filled, cam 150 will lower the plungers to release the cans, these operations occurring successively during the rotation of the table with the cans thereon.

In packing vegetables or fruit, such as tomatoes, it is necessary to force the material through the hopper and the machine comprises collapsible plungers H for discharging the material from the filling-hoppers respectively. These plungers are of the construction set forth in detail, in an application for Letters Patent Serial No. 600,652 filed by me Jan. 3, 1911, and for that reason, a detailed illustration and description is not deemed necessary herein. These collapsible plungers H are each carried by a head $h$ which is secured to the upper end of a plunger-rod $h'$ which is slidably mounted in a guide 155 formed on each of the hoppers C. These plunger-rods $h'$ are operated to drive the collapsible plungers H downwardly through the tapered hoppers and force the material therefrom into the cans, by mechanism comprising a vertical series of rollers $h^2$ which are mounted on the inner face of each rod $h'$, and serve as abutments, and a series of cam-surfaces (Figs. 1, 7, $7^a$ and 8) 156, 157, 158, 159 and 160 on the periphery of cam-wheel L which is stationary and sustained by post 120. During each rotation of the table and filling-hoppers, each rod $h'$, assuming it to start in its uppermost position as shown in Fig. 8, will be held in raised position by the lowermost roller $h^2$ of the series on that plunger traveling on horizontal bearing surface 161 on cam-wheel L and plunger H will in its rotative movement remain raised until the hopper has been filled. Next, the lowermost roller will be acted upon by cam-surface 156, which will positively lower the plunger sufficiently to bring the next roller $h^2$ into operative relation with cam-surface 157, and in this manner cams 158, 159 and 160 will successively act upon the rollers $h^2$, respectively and resultantly the plungers $h'$ will be given a long and sufficient stroke to force the collapsible plunger H to fill tapered hoppers and discharge the material therein into the cans rotating with the hoppers and plungers until rod $h'$ is in position shown in Fig. $7^a$, at which time said plunger will have reached its lowermost position. A similar but oppositely formed or inclined series of cam-surfaces 162, 163, 164, 165 and 166 is formed upon the opposite side of cam-wheel L whereby the series of rollers on the plungers $h^2$ will be successively operated in similar manner to raise the plungers. This construction thus exemplifies plunger-operating mechanism comprising successively or serially acting cam-surfaces or cams for engaging stepped abutments, or abutments of different elevations on the rods $h'$ and avoids the necessity of employing a steep continuous cam for imparting a long stroke to the plungers. Cam-wheel L on which the series of cam-surfaces for raising and lowering the rods $h'$, the filling-hoppers and plungers H are all adjustably sustained by adjustable post 120, so that the operative relation between the said cam-wheel, and the collapsible plungers, and the filling-hoppers will be maintained at times.

After the cans have been filled and are released beneath the filling hoppers, they are deflected from the rotating table D by an inclined guide 169 which is secured to the top of bracket 71 (Fig. 9). Said guide delivers the filled cans onto a rotating table 170 which is continuously rotated (Fig. 4) by a gear 171 on shaft 92 and a gear 172 meshing with said gear. Said gear 172 is secured to a vertical shaft 173 which is mounted in bearings on the frame and is secured to rotating table 170. The latter table, as the cans are delivered onto it, will carry them away from the rotating table D, and into convenient position to be taken from the machine.

The operation of the machine will be as follows: Tomatoes in the bulk will be conducted into drum 18 of the measuring-mechanism, and cans will be delivered into runway 73. The main drive-shaft 34 will impart continuous rotary movement to the table D and the hoppers C and collapsible plungers H which rotate therewith, by means of gears 33, 109, 113 and 114, and said shaft will also drive the measuring-mechanism through gears 33 and 37. Measuring-receptacles 24 in their vertical rotation, will successively receive charges of material as they pass into their lowered position, and their plungers 38 will be operated to compress the material in the receptacles and knife 23ª will sever the excess material from that in the receptacles. When the latter arrive at their uppermost position, their plungers will eject the measured charges through opening 37 into the filling-hoppers. The measuring-devices are timed to deliver a charge for each of the filling-hoppers as they pass under chute 142. Before said hoppers reach the position where they receive charges, the cam-feeding mechanism will have been operated to cause a can to be moved by one of the rotating arms 85 and spring 97, onto the rotating table D and presses the can into position between arms 98 and 99. In rotation, the pivoted walls $c^2$ of the hoppers before they successively pass beneath delivery-spouts 142 will be operated into closed position by the levers 135 and cam-groove 140 on cam-wheel L. After the hoppers have received a charge and cans have been secured beneath them by plungers 147, the collapsible plungers will be operated by the cam-wheel L, to force the collapsible plungers through hoppers and to eject the material in the hoppers into the cans. After this has occurred, the collapsible plungers will be raised out of the hoppers and plungers 147 will be lowered to release the filled cans. The latter will next be removed from rotating table D by deflector 169 and onto table 170. This cycle of operations proceeds continuously so that all of the hoppers and associated mechanisms will be operated to continuously fill cans.

The invention is not to be understood as restricted to the details set forth, as these may be modified within the scope of the appended claims without departing from the spirit and scope of the invention.

Having thus described the invention, what I claim as new and desire to secure by Letters Patent is:

1. In a filling-machine, the combination of a filling-device comprising a hopper and a plunger one of which is movable relatively to the other to force material from the hopper, and mechanism for shifting one element of said device relatively to the other, comprising a plurality of serially coöperating abutments and cams.

2. In a filling-machine, the combination of a filling-device comprising a hopper and a plunger one of which is movable relatively to the other, to force material from the hopper, and mechanism for shifting one element of said device relatively to the other, comprising a plurality of serially coöperating abutments and cams, for operating said movable element in one direction and a plurality of cams for operating said element in the opposite direction.

3. In a filling-machine, the combination of a filling-device comprising a hopper and a plunger movable longitudinally in the hopper to force material therefrom, and mechanism for shifting said plunger comprising a plurality of serially coöperating abutments and cams.

4. In a filling-machine, the combination of a filling-device comprising a hopper and a plunger movable longitudinally in the hopper to force material therefrom, and mechanism for shifting said plunger, comprising a plurality of serially coöperating abutments and cams for shifting the plunger in one direction and a plurality of cams for shifting the plunger in the opposite direction.

5. In a filling-machine, the combination of a plurality of filling-devices, each comprising a hopper and a plunger, movable relatively to each other to force the material therefrom, and mechanism for shifting one element of each of said devices relatively to the other, comprising a plurality of serially coöperating abutments and cams.

6. In a filling-machine, the combination of a plurality of filling-devices each comprising a hopper and a plunger, movable relatively to each other to discharge material from the hopper, and mechanism for shifting one element of each of said devices relatively to the other comprising a plurality of serially coöperating abutments and cams, for shifting said element in one direction and a plurality of cams for shifting said element in the opposite direction.

7. In a filling-machine, the combination of a plurality of rotatable filling-devices each comprising a hopper and a plunger, movable relatively to each other to discharge material from the hopper, mechanism for shifting one element of each of said devices relatively to the other, comprising a plurality of serially coöperating abutments and cams.

8. In a filling-machine, the combination of a plurality of rotatable filling-devices, each comprising a hopper and a plunger, movable relatively to each other to discharge material from the hopper, and mechanism for shifting one element of each of said devices relatively to the other, comprising a plurality of serially coöperating abutments and cams for shifting said element in one direction, and a plurality of cams for shifting said element in the opposite direction.

9. In a filling-machine, the combination of a plurality of rotatable filling devices, each comprising a hopper and a slidable plunger, and mechanism for shifting the plungers, comprising a plurality of abutments on each plunger, and a plurality of cams for successively engaging said abutments.

10. In a filling-machine, the combination of a plurality of rotatable filling-devices, each comprising a hopper and a slidable plunger, and mechanism for shifting the plungers, comprising a plurality of abutments on each plunger, a plurality of cams for successively engaging said abutments to operate the plungers in one direction and a plurality of cams for successively shifting the abutments in the opposite direction.

11. In a filling-machine, the combination of a plurality of rotatable filling-devices, each comprising a hopper and a plunger movable relatively to each other to discharge material from the hopper and mechanism for shifting one of said elements comprising a plurality of abutments on the element to be shifted and rotating therewith, and a plurality of stationary cams for successively shifting the abutments.

12. In a filling-machine, the combination of a plurality of rotatable filling-devices, each comprising a hopper and a plunger movable relatively to each other, to discharge material from the hopper, and mechanism for shifting one of said elements, comprising a plurality of abutments on the element to be shifted and rotating therewith, a plurality of stationary cams for successively engaging the abutments on said element to shift the latter in one direction and a plurality of cams for successively shifting the abutments in the opposite direction.

13. In a filling-machine, the combination of a plurality of rotatable filling-devices, each comprising a hopper and a slidable plunger for discharging material from the hopper, and mechanism for successively shifting the plungers comprising a plurality of abutments on each plunger and a plurality of stationary cams for successively engaging the abutments on each plunger.

14. In a filling-machine, the combination of a plurality of rotatable filling-devices each comprising a hopper and a slidable plunger for discharging material from the hopper, and mechanism for successively shifting the plungers, comprising a plurality of abutments on each plunger, a plurality of stationary cams for successively engaging the abutments on each plunger to shift the plungers in one direction and a plurality of stationary cams for successively engaging the abutments to shift the plungers in the opposite direction.

15. In a filling-machine, the combination of a plurality of rotatable filling-devices, each comprising a hopper and a plunger, movable relatively to each other to discharge the material from the hopper, mechanism for shifting one element of each of said devices relatively to the other, comprising a plurality of serially coöperating abutments, a plurality of cams, rotatable table, and means for conjointly adjusting said devices and said mechanism relatively to the table.

16. In a filling-machine, the combination of a plurality of rotatable filling-devices, each comprising a hopper and a plunger movable relatively to each other to discharge material from the hopper, mechanism for shifting one element of each of said devices relatively to the other, comprising a plurality of serially coöperating abutments and cams for shifting said elements in one direction, and a plurality of cams for shifting said elements in the opposite direction, a rotatable table, and means for conjointly adjusting said devices and said mechanism.

17. In a filling-machine, the combination of a plurality of rotatable filling-devices, each comprising a hopper and a plunger, movable relatively to each other to discharge material from the hopper, mechanism for shifting one element of each of said devices relatively to the other, comprising a plurality of serially coöperating abutments and cams, a rotatable table, mechanism for rotating the table, and a post carrying said devices and said cams.

18. In a filling-machine, the combination of a plurality of rotatable filling-devices, each comprising a hopper and a plunger, movable relatively to each other to discharge material from the hopper, mechanism for shifting one element of each of said devices relatively to the other, comprising a plurality of serially coöperating abutments, a plurality of cams for shifting the movable elements in one direction, and a plurality of successively acting cams for shifting said elements in the opposite direction, a rotatable table, mechanism for rotating the table, and a post carrying said devices and said cams.

19. In a filling-machine, the combination of a rotatable table, a series of filling-devices each comprising a hopper and a plunger, rotatable with the table, a post extending through the table and for rotatably supporting said devices, plunger-shifting mechanism mounted on said post, mechanism for rotating said table, and means for adjusting the post to raise and lower said filling-devices relatively to the table.

20. In a filling-machine, the combination of a rotatable table, a series of filling-devices each comprising a hopper and a plunger, rotatable with the table, a non-rotatable post extending through the table and for rotatably supporting said devices plunger-shifting mechanism mounted on said post, mechanism for rotating said table, and means for adjusting the post to raise and lower said filling-devices relatively to the table.

21. In a filling-machine, the combination of a rotatable table, a series of filling-devices each comprising a hopper and a plunger, rotatable with the table, a post extending through the table, and rotatably supporting said devices, cams mounted on said post, for shifting said plungers, mechanism for rotating said table, and means for adjusting the post to raise and lower said filling-devices and cams, relatively to the table.

22. In a filling-machine, the combination of a rotatable table, a series of filling-devices each comprising a hopper and a plunger rotatable with the table, a post extending through the table and for rotatably supporting said devices, plunger-shifting mechanism mounted on said post, mechanism for rotating said table, a sliding connection between the table and the filling-devices for rotating the filling-devices with the table, and means for adjusting the post to raise and lower said filling-devices relatively to the table.

23. In a filling-machine, the combination of a rotatable table, a series of filling-devices each comprising a hopper and a plunger, rotatable with the table, a post extending through the table and rotatably supporting said devices, plunger-shifting mechanism mounted on said post, mechanism for rotating said table, and screw-mechanism for adjusting the post to raise and lower said filling-devices relatively to the table.

24. In a filling-machine, the combination of a rotatable table, a series of filling-devices each comprising a hopper and a plunger, rotatable with the table, a post extending through the table and for rotatably supporting said devices, plunger-shifting mechanism mounted on said post, mechanism for rotating said table, each hopper having a movable wall, means mounted upon said post for operating said walls, and means for adjusting the post to raise and lower said filling-devices, plunger-shifting mechanism and said wall-operating means relatively to the table.

25. In a filling-machine, the combination of a rotatable table, a series of filling-devices, each comprising a hopper and a plunger, rotatable with the table, a post extending through the table and rotatably supporting said devices, plunger-shifting mechanism mounted on said post, mechanism for rotating said table, each hopper having a movable wall, a cam for operating said walls mounted upon said post, and means for adjusting the post to raise and lower said filling-devices, plunger-shifting mechanism and said wall-operating cam, relatively to the table.

26. In a filling-machine, the combination of a rotatable table, a series of filling-devices each comprising a hopper and a plunger rotatable with the table, a non-rotatable post extending through the table and for rotatably supporting said devices, mechanism for successively shifting said plungers in opposite directions, mounted on said post mechanism for rotating said table, and means for adjusting the post to raise and lower said filling-devices and said plunger-operating mechanism, relatively to the table.

27. In a filling-machine, the combination of a rotatable table, a series of filling-devices each comprising a hopper and a plunger rotatable with the table, a non-rotatable post extending through the table rotatably supporting said devices, a wheel secured to the upper end of said post and having cams thereon for operating said plungers, mechanism for rotating the table, and means for adjusting the post to raise and lower said filling-devices and wall relatively to the table.

28. In a filling-device, the combination of a rotatable table, a series of filling-devices each comprising a hopper and a plunger rotatable with the table, a non-rotatable post extending through the table for rotatably supporting said devices, each hopper having a pivoted wall, a wheel secured to the upper end of said post, having thereon a cam for operating said pivoted walls and cams for operating said plungers, mechanism for rotating said table, and means for adjusting the post to raise and lower said filling-devices and said wall relatively to the table.

29. The combination of a hopper comprising a wall pivoted at its lower end, a plunger for forcing the material from the hopper, mechanism for reciprocating the plunger, a lever for shifting said wall pivoted on the hopper, comprising a pair of arms, an adjustable connection between them, and a cam for operating said lever.

30. The combination of a hopper comprising a wall pivoted at its lower end, a plunger for forcing the material from the hopper, mechanism for reciprocating the plunger, a lever for shifting said wall pivoted on the hopper, comprising a pair of arms, a sliding connection between one of the arms and said wall, and a cam for operating said lever.

31. The combination of a hopper, comprising a wall pivoted at its lower end, a plunger for forcing material from the hopper, mechanism for reciprocating the plunger, a lever for shifting said wall pivoted on the hopper, comprising a pair of arms, an adjustable bolt and slot-connection between said arms and a cam for operating said lever.

32. In a filling-machine, the combination of a drum having an opening therein, a plurality of arcuate sections secured together and mounted to rotate around the drum, the sections having measuring receptacles therein, plungers for forcing the material from the receptacles, mechanism for rotating the receptacles and mechanism for operating the plungers.

33. In a filling-machine, the combination of a drum having an opening therein, a body mounted to rotate around the drum and formed of arcuate sections each forming a receptacle having an inwardly facing opening for receiving material from the drum, plungers for forcing material from the receptacles and mechanism for rotating said body.

34. In a filling-machine, the combination of a drum having an opening therein, heads at the ends of said drum, having tracks thereon, a body mounted to rotate around the drum and having measuring-receptacles therein, rollers on said body traveling on the tracks, plungers in the receptacles, mechanism for operating the plungers, and mechanism for rotating said body.

35. In a filling-machine, the combination of a plurality of rotatable measuring-receptacles, means for delivering material into the receptacles, mechanism for rotating the receptacles, plungers in and rotating with the receptacles, a stationary cam for operating said plungers, rods by which said cam is slidably sustained, and a screw for adjusting the cam to vary the stroke of the plunger.

36. In a filling-machine, the combination of a plurality of rotatable measuring receptacles, means for delivering material into the receptacles, plungers in and rotating with the receptacles, a stationary cam for operating said plungers, a frame on the cam, lugs on said frame, rods on which said lugs are slidably mounted, and a screw sustained by said rods and connected to said frame, for adjusting the cam to vary the stroke of the plunger.

37. In a filling-machine, the combination of a receptacle having a slot in one wall thereof, a plunger slidably mounted in said receptacle, a stud on the plunger and extending through said slot, mechanism for delivering material to the receptacle, mechanism for shifting said stud, and a friction-plate for closing the said slot between the plunger and the wall of the receptacle and having a slot therein through which said stud extends.

38. In a filling-machine, the combination of a series of rotatable receptacles, means for delivering material to the receptacles, plungers in the receptacles and rotatable therewith, studs projecting outwardly from the plungers, the receptacles having slots through which said studs extend, frictionally operated plates between the plungers and the receptacles for closing said slots, mechanism for rotating the receptacles, and mechanism for operating the studs to shift the plungers in the receptacles.

39. In a filling-machine, the combination of a plurality of rotatable filling-devices, each comprising a hopper and a plunger, a table for supporting cans to be filled beneath the hoppers and rotating therewith, posts on the table, positioning devices for the cans comprising a pair of arms on the posts and an adjustable connection between the arms and mechanism for rotating the table and hoppers.

40. In a filling-machine, the combination of a plurality of rotatable filling-devices, each comprising a hopper and a plunger, a table for supporting cans to be filled beneath the hoppers and rotating therewith, posts on the table, positioning devices for the cans comprising a pair of arms on the posts and an adjustable bolt-and-slot connection between the arms, and mechanism for rotating the table and hoppers.

41. In a filling-machine, the combination of an inclined run-way for cans, a centrally pivoted lever having oppositely extending arms for simultaneously engaging a can and holding it in the run-way, a chute formed to turn the cans on their ends, a filling-device, and means for tilting said lever to release the cans.

42. In a filling-machine, the combination of an inclined run-way for cans, a lever for controlling the passage of cans from the run-way, a chute formed to turn the cans on their ends, a filling device, rotating arms disposed to move the cans toward the filling-devices, and means operated by said arms for operating said lever.

43. In a filling-machine, the combination of an inclined run-way for cans, a lever controlling the passage of cans from the run-way, a chute formed to turn the cans on their ends, a filling-device, rotating arms disposed to move the cans toward the filling-devices, and adjustable means operated by said arms for operating said lever.

44. In a filling-machine, the combination of can-feeding mechanism comprising rotatable arms, a shaft on which said arms are mounted, a collar on the shaft, a lug on one of said arms, and screws between which said lug is held and whereby the operation of the arms may be adjusted, and mechanism for filling the cans.

CLARENCE F. COLBERT.

Witnesses:
MARY L. FICKLE,
CLARENCE A. HOY.